United States Patent [19]
Gurtler

[11] 3,782,181
[45] Jan. 1, 1974

[54] DUAL MEASUREMENT ABLATION SENSOR
[75] Inventor: Charles A. Gurtler, Yorktown, Va.
[73] Assignee: The United States of America as represented by the Administrator of the National Aeronautics and Space Administration, Washington, D.C.
[22] Filed: Aug. 11, 1971
[21] Appl. No.: 170,680

[52] U.S. Cl. .................................................. 73/86
[51] Int. Cl. ........................................... G01n 17/00
[58] Field of Search ................................. 73/86, 35; 324/65 CR, 71 E; 338/13; 23/230 C, 253 C; 340/228

[56] References Cited
UNITED STATES PATENTS
2,947,679 8/1960 Schaschl et al. ................ 324/65 CR
3,197,724 7/1965 Marsh ............................ 324/65 CR
3,236,096 2/1966 Macatician et al. .............. 324/71 E
3,357,237 12/1967 Le Bel ................................... 73/86
3,425,268 2/1969 Nelson et al. ........................ 73/86

Primary Examiner—James J. Gill
Attorney—Howard J. Osborn et al.

[57] ABSTRACT

A dual measurement ablation sensor for measuring both char-interface and surface recession at a point in an ablating material to allow an accurate calculation of the thickness of the char layer. Char-interface recession is indicated by a drop in the resistance to a current passed through the ablation material. Surface recession is indicated by the closing of an electrical circuit when melting causes the release of a spring switch.

11 Claims, 1 Drawing Figure

PATENTED JAN 1 1974  3,782,181
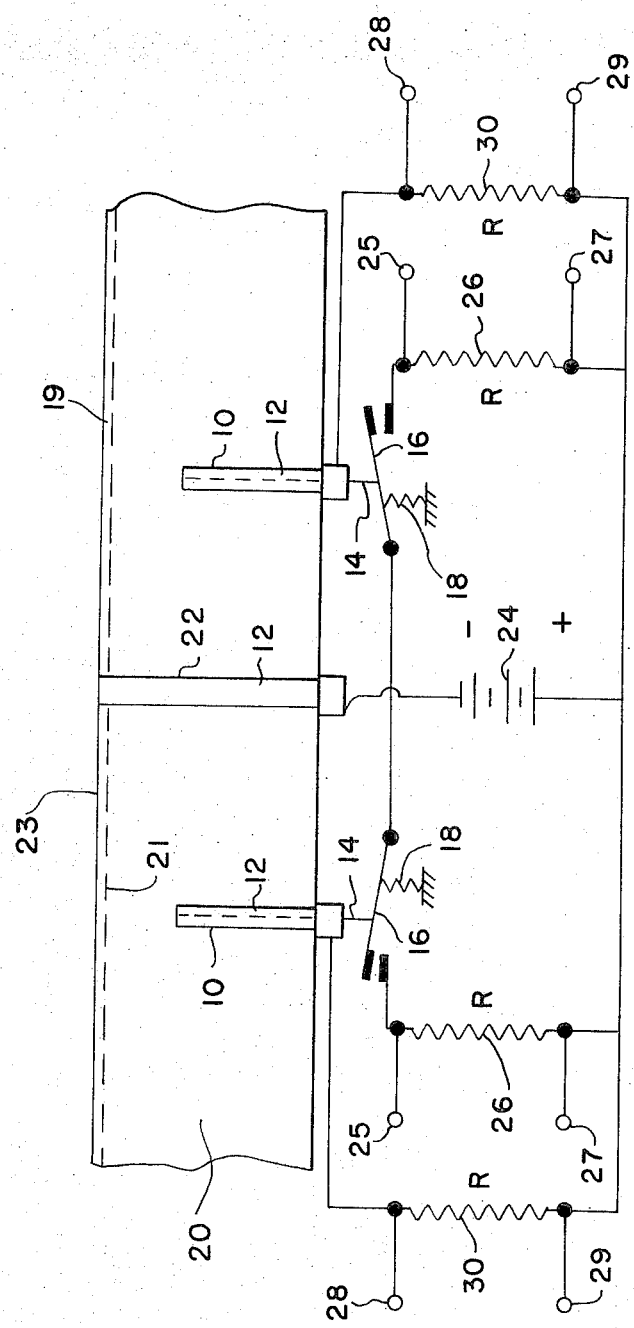
INVENTOR.
CHARLES A. GURTLER
BY
Howard J Odom
ATTORNEY

DUAL MEASUREMENT ABLATION SENSOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to an apparatus for measuring both char-interface and surface recession at a point in an ablating material. The measurement of both of these ablator characteristics at the same point enables a more accurate calculation of the thickness of the char layer. Measurements of the characteristics of ablative-type thermal protection materials during ablation are necessary for the development and most efficient use of these ablative materials. Previous methods of obtaining the char layer thickness during ablation have consisted of obtaining a time history of surface recession at one point on the ablator and char layer recession at another point on the ablator. However, uneven burning of the surface of the heat shield could cause very large errors in obtaining the char layer thickness in this manner. Moreover, the materials used and the implantation process involved in installation of former instrumentation in the heat shield often created surface unevenness during the ablation process.

Therefore, the present invention was conceived to enable measurement to surface and char interface recession at the same point in the heat shield and to use materials which would melt or ablate along with the ablation material.

SUMMARY OF THE INVENTION

In the dual measurement ablation sensor, a small metal sensor tube containing a wire (attached to a snap-action switch) and an electrical circuit through the switch comprises the equipment used to indicate surface recession. This mechanism is old in the art and is fully described in U.S. Pat. No. 3,425,268. The sensor tube, inserted to a predetermined depth in the heat shield, releases the wire allowing switch closure and electrical circuit completion, when the point of attachment of the wire melts during ablation. The metal sensor tube also serves as an electrode being wired through a separate circuit to another electrode comprised of a metal tube inserted full depth in the ablation material. Current in the second circuit passes from the full depth tube through the ablation material to the sensor tube. Both metal tubes are constructed of a material which melts at or near the expected ablator surface temperature. In the case of the ablation material which is electrically nonconducting the metal tubes are plated with gold to provide low electrical resistance contact with the electrically conductive char layer. As the bottom of the char layer or the char-interface reaches the metal sensor tube its arrival is indicated by significant decrease in electrical resistance. In the case of an ablation material which is an electrical conductor the sensor tubes are coated with teflon which provides the electrical insulation from the uncharred ablation material. During ablation the elevated temperature at the char-interface sublimes the teflon and allows the sensor tube to make contact with the char. This decreased resistance is then used to indicate the event. Shortly after the arrival of the bottom of the char layer or char-interface at the metal sensor tube, the surface reaches the sensor tube and the wire holding open the snap-action switch is released closing the switch, completing the circuit and indicating surface recession. This time interval when multiplied by the ablation rate will give the thickness of the char layer at the point of measurement by the sensor tube. In the ordinary application a group of sensor tubes may be installed in the ablation material at several predetermined depths, each connected to a snap-action switch for recording surface recession and each wired in a separate circuit through a single full depth tube to indicate char-interface recession. By knowing the depth of each sensing element in the heat shield and the time of surface and char-interface recession, the rate of char-interface recession ablation rate and char thickness changes can be determined Accordingly, it is an object of the invention to provide a dual measurement ablation sensor to measure char-interface and surface recession at the same location on the heat shield. The use of material which melts at or near the expected ablation surface temperature insures that the affect of the sensor on the physical property characteristics of the thermal protection material will be minimal. The machining of large holes and the insertion of plugs in the ablator are not required. This is true since the sensors can have thin walls and be made of small tubing requiring a very small hole, typically 0.02 inch. The sensor can be used over a wide temperature range without affecting the signal to the telemetry system. The sensor is a lightweight, compact, rugged device that will withstand severe shock and requires a minimal of associated electronic equipment.

BRIEF DESCRIPTION OF THE DRAWING

The more complete appreciation of the invention and many of the attendant advantages thereof will be readily apparent as the same becomes better understood by reference to the following detailed description when considered in connection with the accompanying drawing wherein:

FIG. 1 is a schematic view of the novel dual measurement ablation sensor.

DESCRIPTION OF THE PREFERRED EMBODIMENT

Referring now to FIG. 1, there is shown an ablation material 20 containing a metal sensor tube 10 (typical diameter 0.02 inch) coated with a coating material 12. A fine wire 14 (typical diameter 0.003 inch) is attached to switch 16 and extends through the length of metal sensor tube 10. Switch 16 is spring-loaded to the closed position by spring 18 and opens by wire 14. When switch 16 is closed an electrical circuit is completed from voltage source 24 through switch 16 and is recorded at output terminals 25 and 27 by a change in output resistance 26.

During ablation of ablation material 20 a char layer 19 is formed near the ablation surface 23. The char layer is of a finite thickness having a bottom 21. A full depth tube 22 (typical diameter .02 inch) extends through the ablation material 20 to surface 23. Current from voltage source 24 passes through full depth tube 22 through the char layer 19 through the sensor tubes 10 and back across the output terminals 28 and 29 and the output resistance 30.

OPERATION

The operation of the present invention is now believed apparent. The metal sensor tubes 10 record ablation material surface recession as described in the U.S. Pat. No. 3,425,268. As the ablation surface 23 reaches the level of the metal sensor tubes 10 the point of attachment of fine wire 14 melts releasing wire 14, and allowing switch 16 to be closed by spring 18. The completion of the electrical circuit is recorded as the change in the output resistance 26 and the time of the change is noted.

The properties of char layer 19 are such that it offers much less resistance to electricity than does ablation material 20. Full depth tube 22 acting as an electrode passes current through char layer 19 to sensor tubes 10 whenever the bottom of the char layer 21 reaches the top of sensor tube 10. For an electrically nonconducting ablation material 20, full depth tube 22 and sensor tubes 10 are coated with gold coating material 12 to provide low electrical resistance contact with conductive charred material. When the bottom of char layer 21 reaches the top of sensor tube 10 a drop in the output resistance 30 indicates char interface precipitation and the time is noted.

Several metal sensor tubes 10 are implanted in ablation material 20 in various predetermined gaps. These metal sensor tubes 10 serve as electrodes wired separately through a common second electrode consisting of a full depth tube 22. As the bottom of the char layer 21 reaches the depth of each of the metal sensor tubes 10, recession of the char interface to that particular level is indicated by a change in output resistance 30 and the time noted. A short interval after indication of char interface recession each metal sensor tube 10 will release wire 14, close switch 16, and indicate surface recession or the passage of ablation surface 23 at that particular level by the change in output resistance 26 and the times will be noted. Noting the depth of implantation of each of the metal sensor tubes 10 and the time of ablation surface recession indicated by each tube, the ablation rate may be calculated. Noting the depth of implantation of the metal sensor tube 10 and the times of indication of char interface recession obtained from output resistance 30 the rate of char interface recession may be calculated. A comparison of ablation rate and char interface recession rate reveals changes in char thickness. The thickness of the char layer may be calculated by multiplying the interval between surface recession and char interface recession at a particular metal sensor tube 10 by the ablation rate.

Although the invention has been described and illustrated in detail on a specific embodiment thereof, it is to be understood that this description is by way of illustration only and is not to be taken as limiting upon applicant's invention. Obviously, there are many modifications and variations of the present invention possible in the light of the above teachings. If the ablation material 20 is an electrical conductor, the coating 12 which covers the metal sensor tubes 10 will be teflon. Sublimation of the teflon due to the elevated temperature of the char interface will allow the metal sensor tube 10 to make contact with the char layer 19 indicating char interface recession by the change in output resistance 30. Where gold has been specified for the coating 12, any material having a low electrical resistance may be used. Instead of a teflon coating 12 for use on ablation material 20 as an electrical conductor, any insulating material which melts or sublimes at or near the char interface temperature will suffice. The metal used in sensor tubes 10 and full depth tube 22 may be a metal or other material having a melting point or sublimation point at or near the ablation temperature.

What is claimed as new and desired to be secured by letters Patent of the United States is:

1. An ablation sensor comprising: an ablation material; a first electrode means imbedded full depth in said ablation material for conducting a current through said ablation material; a second electrode means implanted at a predetermined depth in said ablation material for conducting a current passed through said first electrode means and said ablation material; a first electrical circuit means for indicating a change in resistance when the inner surface of a char layer formed on said ablation material reaches said second electrode means; a second electrical circuit means for indicating a change in resistance when the outer surface of said char layer reaches the second electrode means whereby the time interval between the change in resistances is an indication of the char layer thickness.

2. The sensor of claim 1 wherein said ablation material is electrically nonconducting, said electrode means are tubes constructed of a material which melts at or near the expected ablation surface temperature, said tubes are coated with a material which provides a low electrical resistance contact with the char layer, whereby electrical resistance between said electrode means decreases abruptly when the char layer reaches the depth of said second electrode means and this decreased resistance is indicated by said first electrical circuit means.

3. The sensor of claim 1 wherein said ablation material is an electrical conductor, said electrode means are tubes constructed of a material which melts at or near the expected ablation surface temperature, and said tubes are coated with an electrical insulating material which dissolves when exposed to the elevated temperatures of said char layer, whereby the insulation surrounding said second electrode means dissolves permitting contact between said second electrode means and said char layer whereupon a decrease in electrical resistance noted by said first electrical circuit means indicates that said char layer has progressed to the depth of said second electrode means.

4. The sensor of claim 2 wherein the material used for coating said tubes is gold.

5. The sensor of claim 3 wherein the material for coating said tubes is polytetrafluoroethylene.

6. The sensor of claim 1 wherein said second electrode means comprises a plurality of electrodes implanted at varying predetermined depths throughout said ablation material for conducting a current passed through said first electrode means and said ablation material, and wherein said first electrical current means is a plurality of electrical circuits to measure a plurality of electrical resistances between said first electrode means and each of said plurality of electrodes whereby a time history of the progress of said char layer through said ablation material during ablation may be obtained.

7. The sensor of claim 6 wherein said ablation material is electrically nonconducting, said first electrode means and said plurality of electrodes are tubes constructed of a material which melts at or near the expected ablation surface temperature, and said tubes are coated with a material which provides a low electrical resistance contact with the char layer whereby electrical resistance between said first electrode means and said electrodes decreases abruptly as the char layer reaches the depth of each of said plurality of electrodes and this decreased resistance is indicated by said first electrical circuit means.

8. The sensor of claim 7 wherein the material used for coating said tubes is gold.

9. The sensor of claim 6 wherein said ablation material is an electrical conductor said first electrode means and said plurality of electrodes are tubes constructed of a material which melts at or near the expected ablation surface temperature, and said tubes are coated with an electrical insulating material which dissolves when exposed to the elevated temperatures of said char layer whereby the insulation surrounding said electrodes dissolves permitting contact between said electrodes and said char layer and a decrease in electrical resistance noted by said electrical circuit means indicates the progress of said char layer to the depth of each of said plurality of electrodes in turn.

10. The sensor of claim 9 wherein the material for coating said tubes is polytetrafluoroethylene.

11. The sensor of claim 6 wherein said plurality of electrodes have a plurality of second electrical circuit means for indicating a change in resistance, said plurality of first and second electrical circuit means provide a time history of the movement of the ablating surface of said ablation material whereby the rate of ablation, the rate of charring and the thickness of the char layer may be calculated.

* * * * *